Patented Oct. 3, 1950

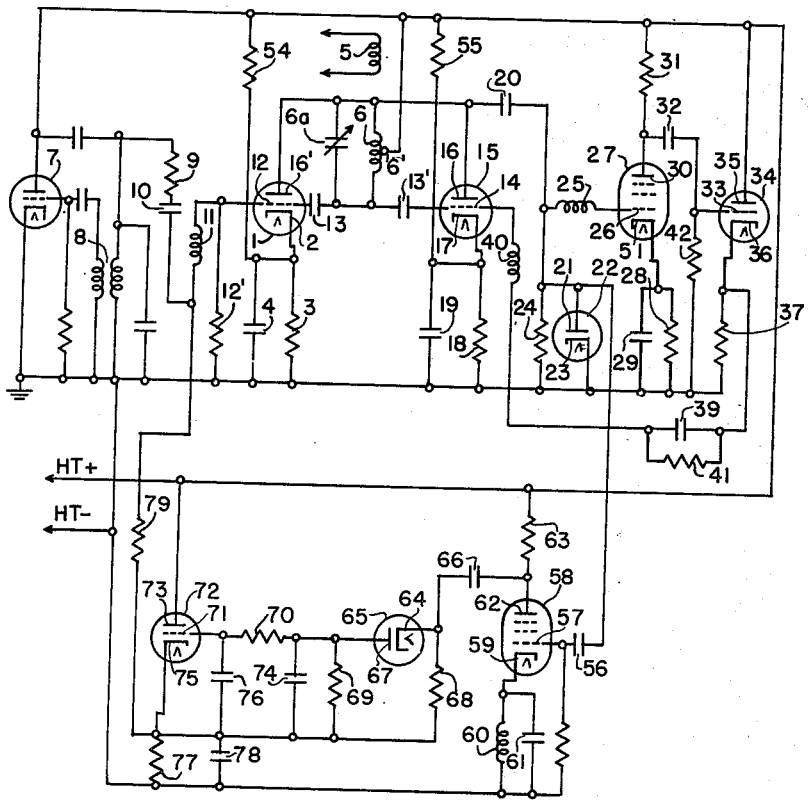
INVENTORS
HUBERT WOOD
RICHARD HARRIES DAVIES
JAMES RENNIE WHITEHEAD

2,524,494

UNITED STATES PATENT OFFICE 2,524,494

WAVE-SIGNAL RESPONDER SYSTEM

Hubert Wood and Richard H. Davies, Hollinwood, and James Rennie Whitehead, London, England, assignors to Ferranti Limited, Hollinwood, England, a corporation of Great Britain Application July 22, 1947, Serial No. 762,734
In Great Britain December 28, 1945

Section 1, Public Law 690, August 8, 1946
Patent expires December 28, 1965

4 Claims. (Cl. 250—15)

This invention relates to apparatus for use in wireless signalling systems of the kind in which a transmitter having a receiver associated therewith, is arranged to radiate a response signal in reply to an interrogation signal received by such associated receiver.

More particularly the invention relates to such receiver/transmitter devices, usually known as "responders" of the type adapted for use with a pulsed interrogating signal and is an improvement in or modification of the responder, hereinafter referred to as a "responder of the type stated" as described and claimed in an application of Hubert Wood, Richard H. Davies, and James R. Whitehead, Serial No. 35,039/45, filed in Great Britain on December 28, 1945, entitled Improvements Relating to Radio Receivers of the Type Associated with Transmitting Means, and assigned to the same assignee as the present application. One particular form of such responders as described in said prior patent application is that in which reception of the interrogating signal pulses is effected by means including a super-regeneratively operated valve and in which a common tuned oscillatory circuit is employed for both reception and subsequent retransmission of response signals whereby the response is always sent at the same frequency as that of interrogation. It is with this particular form that the present invention is concerned.

In one arrangement of this form of responder of the type stated a single valve performs the dual function of a super-regeneratively operated amplifier for the reception of interrogating pulses and, when supplied by way of a pulse widening circuit with a suitable controlling potential derived from the received interrogating pulse signals, as a transmitting oscillator.

In another arrangement of the same general form of responder of the type stated, a double-triode valve having a common cathode is employed for both the super-regenerative receiving valve and transmitting oscillator valve functions, the requisite quench oscillation being fed to the control grid of one valve section and the output from the pulse-width controlling circuit being fed to the control grid of the other valve section. The tuned circuit is again common to both valve sections, being connected between their anodes and control grids.

In the first-mentioned form the common single valve is subject to the quench oscillation even when functioning as an oscillator for retransmitting the modified signal pulses, and thus the transmitted response signal is modulated at the quench frequency. The second form of responder is free from this disadvantage but has nevertheless, in common with the previous form of responder, certain other disadvantages.

Firstly, owing to the sensitiveness of the super-regenerative receiver valve, random voltage fluctuations or "noise" present in the receiving valve circuit when amplified and fed back to the grid of the transmitting valve, are likely to cause transmission of pulse signals in a form indistinguishable from that of the proper modified signal pulses sent in response to an interrogating signal.

Secondly, another difficulty presents itself when either form of responder is employed in association with automatic gain stabilization means, that is to say, with means for maintaining the sensitivity of the super-regenerative receiver valve constant or nearly constant as a characteristic of the responder is altered. By a "characteristic of the responder" we mean, for example, the frequency to which it is tuned, which may be variable over a wide range, or the value of the high-tension supply, or the aerial loading, which may vary with changing frequency or with moisture deposition. An example of such automatic gain stabilization means is set forth in an application of Hubert Wood et al., Serial No. 35,039/45, filed in Great Britain on December 28, 1945, entitled Improvements Relating to Radio Receivers of the Type Associated with Transmitting Means, and assigned to the same assignee as the present application.

The feature of an automatic gain stabilization means is the application to the receiving valve of a compensating potential determined by the random voltage fluctuations or "noise" present in the receiving valve when it is not receiving signal pulses, that is to say, when it is in its normal quiescent state. During the retransmission of a response signal pulse the larger amplitude oscillations present in the common tuned circuit give rise to grid current flow in the single valve or double-triode valve connected thereto with the result that, after the retransmission there is a heavy negative grid-to-cathode bias owing to the accumulated charges present on the condensers in the grid and cathode circuits. Some time therefore must elapse before these condensers can discharge through their associated resistances sufficiently for the automatic gain stabilization means to restore the receiving valve to the required sensitivity for normal reception. It is not possible to reduce the time constants of these condenser circuits since the width of the response pulse transmitted is also dependent on them. The frequency at which the interrogating pulses recur may be such that there is insufficient time for the automatic gain stabilization means to resume control between pulses, with the result that the responder may not operate satisfactorily.

The main object of the present invention is to provide a responder of the type and form stated which is free from the above disadvantages.

According to the present invention, a wave-signal responder comprises a super-regenerative circuit including a regenerator valve, means for maintaining the sensitivity of the super-regenerative circuit substantially constant as a characteristic of the responder system is altered, and a transmitting valve controlled by the received signal output of the super-regenerative circuit, the receiving valve and transmitting valve having a common oscillatory circuit connected between their control grids and anodes but each having separate and mutually independent cathode circuits.

One embodiment of the invention will now be described by way of example with reference to the accompanying drawing which shows a circuit arrangement of a responder of the type stated embodying the invention.

This embodiment comprises a super-regenerative radio receiver including a triode receiving valve 1 forming part of a Hartley-type oscillator, the cathode 2 of the valve being connected to the earthed negative pole of a high-tension supply by way of a biasing resistance 3 and its radio-frequency decoupling condenser 4 and to the positive pole of the high-tension supply by way of a resistance 54. The aerial, not shown, is coupled by coil 5 to the inductance 6 of tuned circuit including variable condenser 6a. The mid-point 6' of the inductance is connected to the positive pole of the high-tension supply.

A quench-frequency oscillator is provided consisting of a triode valve 7 connected as a conventional feed-back oscillator. The high-potential end of inductance winding 8 of this oscillator is joined by way of a resistance 9, blocking condenser 10, and radio-frequency choke 11 to control grid 12 of valve 1.

One end of the tuned circuit 6, 6a is connected by way of condenser 13 to control grid 12 of valve 1 and by way of condenser 13' to the control grid 14 of a triode transmitting valve 15, the anode 16 of which is joined to the other end of tuned circuit 6, 6a. Cathode 17 of valve 15 is connected to earth by way of a biasing resistance 18 having a condenser 19 in parallel therewith and to the positive pole of the high-tension supply by way of a resistance 55. The anode side of tuned circuit 6, 6a is connected by way of condenser 20 to anode 21 of a diode detector valve 22, the cathode 23 of which is connected to earth. The anode and cathode of this diode valve are shunted by load resistance 24. Anode 21 of this diode valve is also connected by way of radio-frequency choke 25 to the control grid 26 of a pentode amplifier valve 27. Cathode 51 of valve 27 is connected to earth through the parallel combination of biasing resistance 28 and decoupling condenser 29. Anode 30 of valve 27 is joined to the positive pole of the high-tension supply by way of resistance 31 and is also connected by way of condenser 32 to the control grid 33 of a triode valve 34. Anode 35 of this valve is joined directly to the positive pole of the high-tension supply while cathode 36 is joined to earth by way of a cathode-load resistance 37 and is further connected through a pulse-width controlling circuit, comprising condenser 39 and a parallel resistance 41, and a radio-frequency choke 40 to control grid 14 of transmitting valve 15. A grid-leak resistance 42 is connected between control grid 33 and earth.

A connection is also made from anode 21 of diode valve 22 through a condenser 56 to control grid 57 of a pentode amplifier valve 58, a grid-leak resistance being provided between such control grid and earth. Cathode 59 of valve 58 is connected to earth through an inductance 60 and a parallel condenser 61 while the anode 62 is joined to the positive pole of the high-tension supply by way of a load resistance 63. The circuit formed by inductance 60 and condenser 61 is arranged to be resonant at the quench frequency. Anode 62 is also connected to cathode 64 of a diode rectifier valve 65 by way of condenser 66, cathode 64 being joined to the anode 67 of this diode through two serially connected resistances 68 and 69. The anode 67 of diode valve 65 is also connected by way of resistance 70 to the control grid 71 of triode valve 72, the anode 73 of which is connected directly to the positive terminal of the high-tension supply. Anode 67 is also connected by way of condenser 74 to the junction of resistance 68 and 69 and to the cathode 75 of valve 72, the latter electrode being also joined by way of condenser 76 to control grid 71. Resistances 69 and 70, together with condensers 74 and 76 form a smoothing circuit. Cathode 75 is also connected to earth by way of a cathode-load resistance 77 shunted by condenser 78 and is further joined by way of resistance 79 to the end of choke 11 remote from control grid 12 of triode valve 1.

In operation, signal pulses transmitted from a ground or other remote interrogating station are picked up by an aerial, not shown, fed to tuned circuits 6, 6a, amplified super-regeneratively by valve 1 and are rectified by diode valve 22 and its associated components. The resulting rectified signals are amplified by pentode valve 27 and are then applied to the control grid circuit of valve 34. The positive polarity pulse output appearing across resistance 37 is modified insofar as its width is concerned by the pulse-width controlling circuit formed by condenser 39 and resistance 41, and appears in this modified form at the control grid 14 of transmitting valve 15. Valve 15 which is normally held in suppressed condition by the negative bias potential imposed on its control grid by the network 55, 18, is thereby caused to oscillate violently and cause retransmission of a response pulse signal.

During the intervals between reception of interrogating signal pulses, periods of radio-frequency oscillations due to the super-regenerative amplification of the random voltage fluctuations or "noise" in the current of valve 1, and recurrent at the frequency of the quenching oscillations, are produced across load resistance 24. These oscillations, on being rectified by the diode detector valve 22, deliver an output which comprises random voltage fluctuations, with a strong quench-frequency component having a random amplitude variation. This output is employed to derive a potential for controlling the amount of regeneration within the super-regenerative circuit of valve 1 by varying the grid-to-cathode bias of such valve in the following manner.

The output from diode valve 22 is fed to pentode amplifier valve 58 by way of condenser 56 and the amplified output from this valve is taken from across its load resistance 63. This output has no strong quench-frequency component owing to the degenerative feed-back effect of the tuned rejector circuit 60, 61 in its cathode lead. This output is then transferred as an input potential to diode rectifier valve 65. The rectified output from this valve develops a mean direct current in load resistance 69 and the resulting potential across this resistance, which is proportional to the mean amplitude of the random voltage fluctuations, is smoothed by the smoothing circuit formed by resistance 70 and condensers 74 and 76 and is fed as a negative bias potential to control grid 71 of triode valve 72. This potential is not sufficient to bias the valve beyond its cut-off value. A varying potential is accordingly developed across resistance 77 and this is transferred by way of resistance 79 and choke 11 to the control grid 12 of valve 1 of the super-regenerative receiving stage as a varying positive potential.

If now the super-regenerative receiver becomes more sensitive, for instance, consequent upon a change in the tuning frequency, the "noise" oscillations produced across load resistance 69 increase. Consequently, control grid 71 of valve 72 becomes more negative and the potential across cathode load resistance 77 is decreased, thereby reducing the positive potential applied to control grid 12 of valve 1 which, in turn, leads to a decrease in the amount of regeneration and hence the amplitude of the "noise" oscillations produced by such super-regenerative receiving stage. Hence it will be seen that the sensitivity of the latter stage is reduced to its original value. Adequate compensation is provided since the values of the components associated with valves 58, 65 and 72 are suitably chosen to provide sufficient gain.

It will be seen that the transmitted pulse is not modulated at the frequency of the quench oscillations since those oscillations are not applied to transmitting valve 15 because condensers 13, 13' together with the lower half of inductance 6 comprise a filter which does not pass quench-frequency potentials. Further it will be seen that by making the cathode circuit of receiving valve 1 independent of that of the transmitting valve 15, the condenser may be made of sufficiently small capacity to provide a short time constant in the cathode circuit of valve 15 thereby permitting the receiving valve quickly to return to its normal quiescent state after transmission of a response signal with consequent efficient stabilization while, at the same time, the condenser 19 of the transmitting valve cathode circuit may be made adequately large for the purpose of enhancing the width of the modified pulse.

Resistance 54 ensures that cathode 2 of valve 1 is maintained at the requisite positive potential with respect to grid 12 when the valve is operating under normal receiving conditions while permitting a relatively low value of resistance 3 for the purpose of shortening the time constant of the network 3, 4 to the required value. Resistance 55 serves a somewhat similar purpose with regard to valve 15, which is by this means, by maintaining the control grid of such valve at or beyond its cut-off value except when a positive potential is applied thereto from the valve 34, prevented from transmitting signals caused by random voltage fluctuations.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal responder system comprising, a superregenerative circuit including a regenerator valve, means for maintaining the sensitivity of said circuit substantially constant as a characteristic of the responder system is altered, and a transmitting valve controlled by the received signal output of said superregenerative circuit, said regenerator valve and said transmitting valve having a common oscillatory circuit connected between their control grids and anodes but each having separate and mutually independent cathode circuits.

2. A responder as claimed in claim 1 in which the cathode circuits of each of said receiving and transmitting valves comprise a resistance and a parallel condenser, the time constant of the cathode circuit of said receiving valve having a value selected to ensure rapid recovery of such valve to its normal quiescent condition after the transmission of each response pulse and the time constant of the cathode circuit of said transmitting valve having a value selected to provide a desired value of pulse duration of the response pulses transmitted by said transmitting valve.

3. A responder as claimed in claim 1 in which said common oscillatory circuit comprises a parallel inductance and capacity network connected directly at one end to the anodes of each of said receiving and transmitting valves and connected at its other end to the control grids of each of said valves by way of separate blocking condensers, the values of said blocking condensers being such that in conjunction with said inductance they constitute a filter network to prevent the transmission of quenching-frequency oscillations from said receiving-valve control grid to said transmitting-valve control grid.

4. A responder as claimed in claim 3 in which said inductance is tapped intermediate its ends and connected therefrom to the positive terminal of a high-tension supply source.

HUBERT WOOD.
RICHARD H. DAVIES.
JAMES RENNIE WHITEHEAD.

REFERENCES CITED

The following references are of record in the file of this patent:

UNITED STATES PATENTS

| Number | Name | Date |
|---|---|---|
| 2,414,992 | Wheeler | Jan. 28, 1947 |
| 2,415,667 | Wheeler | Feb. 11, 1947 |
| 2,429,513 | Hansen et al. | Oct. 21, 1947 |